Oct. 16, 1928.
L. F. NELSON
1,687,846
DEVICE USED IN PIE BAKING
Filed Jan. 22, 1927
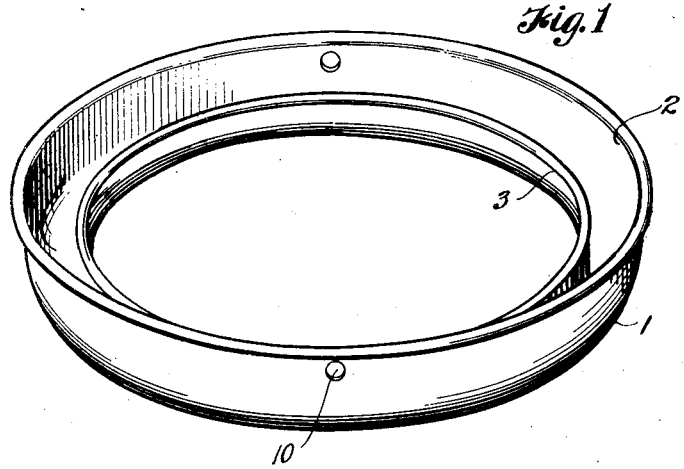
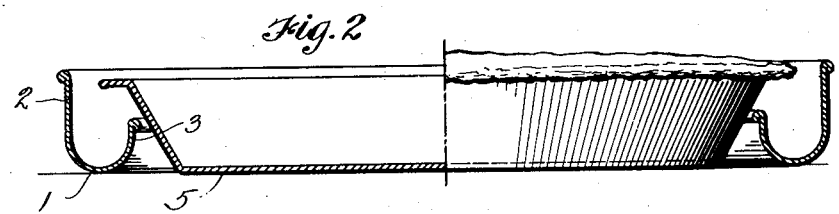
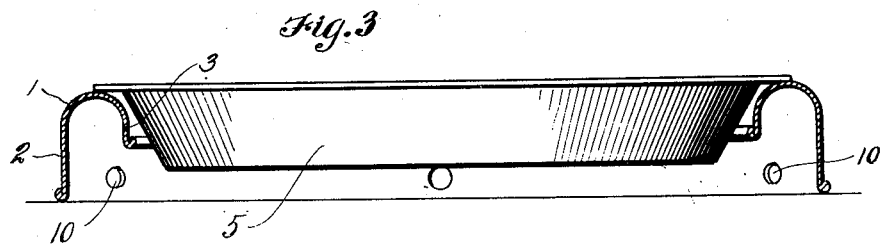
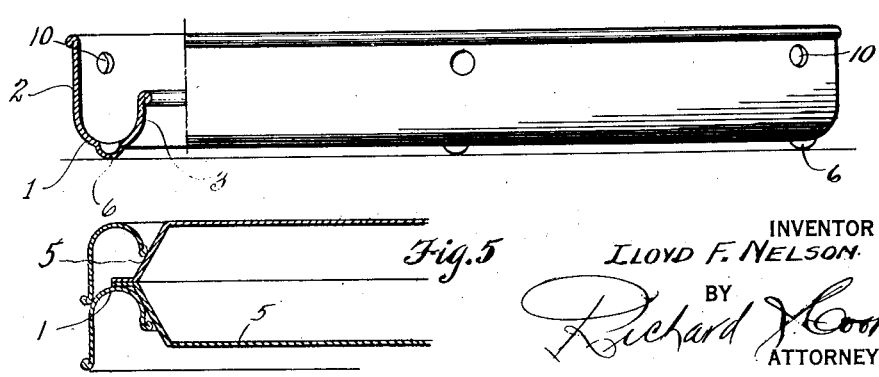
INVENTOR
LLOYD F. NELSON.
BY
Richard J. Cook
ATTORNEY Patented Oct. 16, 1928.

1,687,846

UNITED STATES PATENT OFFICE.

LLOYD FRANK NELSON, OF SEATTLE, WASHINGTON.

DEVICE USED IN PIE BAKING.

Application filed January 22, 1927. Serial No. 162,818.

This invention relates to improvements in means used in pie baking, for catching the overflow of juices from the pie pan; the object of the invention being to provide a device of the above character that is adapted for use both as a juice catching means and also as a support on which hot dishes or pans may be placed so as to be held up from a table top or other surface that would be damaged by the heat of the pan or dish if placed directly thereon.

More specifically stated, the object of this invention is to provide a device in the form of an annular trough within which a pie pan may be placed during the baking process and which will serve to catch all overflow of juices from the pie during the baking; also, which may be inverted and used, in this manner, as a support on which hot dishes or pans may be placed for cooling or while food is being served therefrom, and which will hold the dish or pan up off of the table surface to avoid damage thereto by the heat.

Other objects of the invention reside in the various details of construction and combination of parts as is hereinafter described.

In accomplishing these and other objects of the invention, I have provided the improved details of construction, the preferred forms of which are illustrated in the accompanying drawings, wherein—

Figure 1 is a perspective view of a juice catching device and dish support embodied by the present invention.

Figure 2 is a side and sectional view of the device as used for catching overflow of juices from a pie while the latter is being baked.

Figure 3 is a similar view, illustrating the use of the device, when placed in an inverted position, as a support for a hot dish or pie pan.

Figure 4 is a side view and partial section of a device of a slightly modified construction.

Figure 5 is a sectional view illustrating another use of devices of the present character.

Referring more in detail to the drawings—

The device, in its preferred form, is made of light but durable metal and comprises an annular trough 1 which, in cross section on a radial line, presents a radially curved base that continues into a substantially vertical outer wall 2 and a vertical inner wall 3. The outer wall extends sufficiently high that its periphery will be even with or slightly above the edge or rim of the ordinary type of pie pan that may be placed therein, while the inner wall is approximately but one-half the height of the outer wall so that its periphery will be clear of the pie pan and will not interfere with the pan resting on the oven base.

In Figure 2, I have illustrated the device as used during pie baking. In this use, the trough is first placed in the oven and the pie pan, which is designated at 5, is placed within it, with the base of the pie pan resting on the bottom wall of the oven and its periphery projecting above the trough in such manner that any overflow of juices from the pie will fall into the trough and will not flow into the oven where it would burn or smoke.

For use as a support for hot dishes or pans, the trough is inverted so that it will be supported on the periphery of its outer wall. Then the dish or pan to be supported thereby is placed on top of it as is shown in Figure 3. When so used the pan seats down within the trough so that it cannot slide off and is held up from the surface on which the trough is placed so that this surface will not be damaged by the heat.

The outer side wall of the trough is provided with a plurality of perforations 10 for a circulation of air to prevent steaming or a collection of moisture on the supporting surface. These are placed above the level of the edge of the inner wall.

If it is so desired, the base of the trough may be provided with a plurality of downwardly pressed protuberances 6 which will support it slightly above the base of the oven so as to prevent the juices that fall into the trough from burning or smoking.

In Figure 5 is illustrated a use of two of the devices with two pie pans to provide a baking utensil. In this use the pans 5 are placed face to face with their edges together and are set down within one of the inverted troughs, then another inverted trough is set down so as to encircle the pans and to overlap the first trough. In this way, the second trough holds the upper pan against displacement.

Devices of this character may be made in various sizes, depths and widths to accommodate them for pans of various size and they may be used for either of the purposes stated.

Having thus described my invention, what

I claim as new therein and desire to secure by Letters-Patent, is:

The combination of a pie pan having an upper peripheral flange, a reversible annular trough to catch the overflow from said pie pan, said trough having its outer wall higher than the depth of the pan and provided with perforations and serving to support the pan by the flange in an elevated position to permit the circulation of air below the pan.

Signed at Seattle, Washington, this 16th day of September, 1926.

LLOYD F. NELSON.